United States Patent [19]

Metzger et al.

[11] 4,393,033
[45] Jul. 12, 1983

[54] PROCESS FOR THE PREPARATION OF AMMONIUM SULFAMATE

[75] Inventors: Adolf Metzger, Wiesbaden; Rolf Konrad, Steinbach; Reinhold Gräser, Frankfurt am Main, all of Fed. Rep. of Germany

[73] Assignee: Hoechst Aktiengesellschaft, Frankfurt am Main, Fed. Rep. of Germany

[21] Appl. No.: 332,236

[22] Filed: Dec. 18, 1981

[30] Foreign Application Priority Data

Dec. 19, 1980 [DE] Fed. Rep. of Germany ....... 3048057

[51] Int. Cl.³ .................... C01B 21/093; C01B 21/086
[52] U.S. Cl. .................................................. 423/388
[58] Field of Search ........................................ 423/388

[56] References Cited

U.S. PATENT DOCUMENTS 3,661,516 5/1972 Hofmeister .......................... 423/388
4,261,963 4/1981 Münster ............................. 423/388

Primary Examiner—O. R. Vertiz
Assistant Examiner—Wayne A. Langel
Attorney, Agent, or Firm—Berman, Aisenberg & Platt

[57] ABSTRACT

Ammonium sulfamate is prepared continuously, starting from ammonia and sulfur trioxide, by introducing liquid sulfur trioxide and liquid ammonia in a molar ratio $NH_3/SO_3$ greater than 2.0:1 into a pressure reactor containing molten reaction product. Excess ammonia is removed continuously from the reactor. The liquid sulfur trioxide is introduced into the melt, while the liquid ammonia is fed onto the surface of the melt.

8 Claims, 1 Drawing Figure

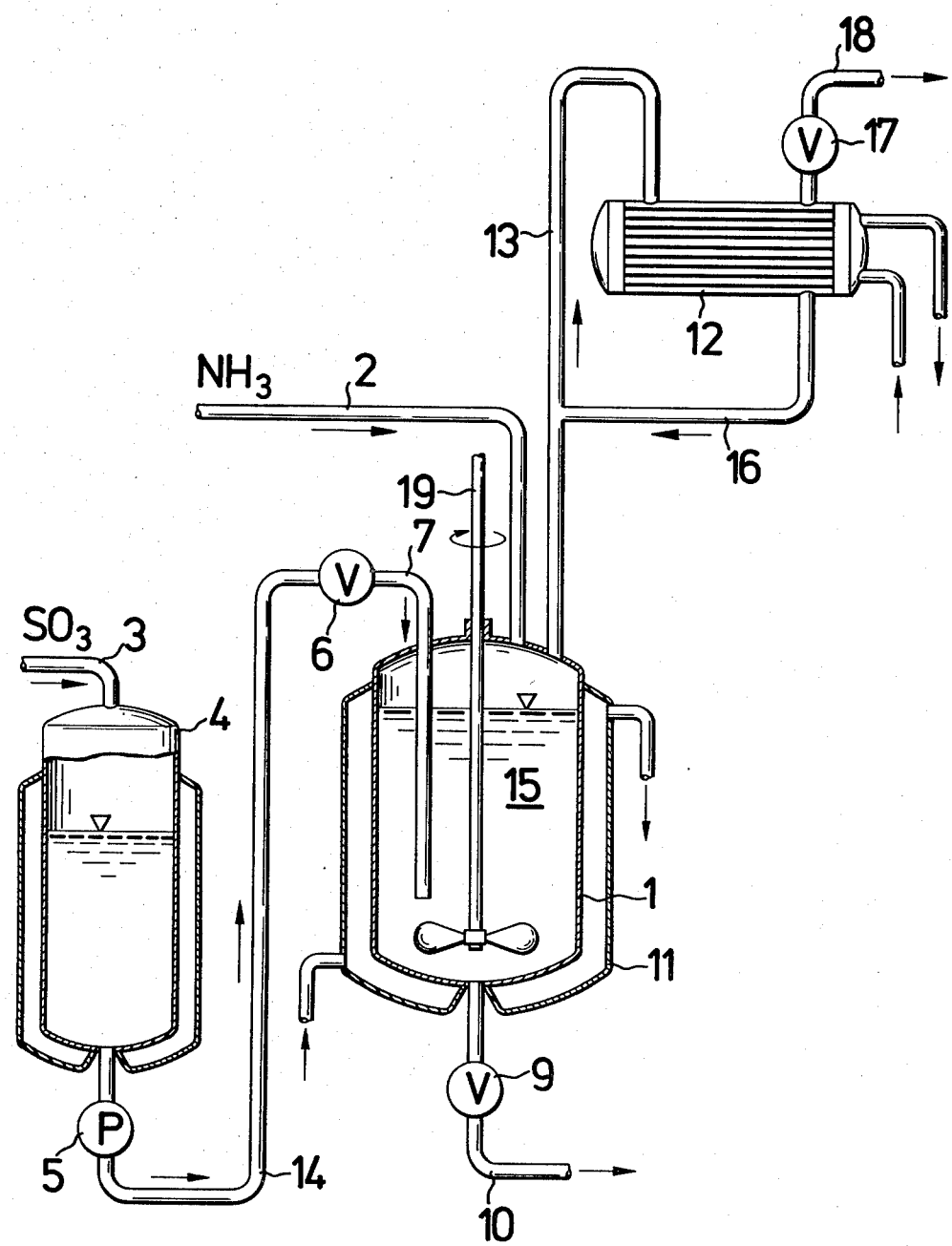

PROCESS FOR THE PREPARATION OF AMMONIUM SULFAMATE

The invention relates to an improved process for the preparation of ammonium sulfamate from ammonia and sulfur trioxide under pressure. Ammonium sulfamate constitutes an important starting material for the preparation of free amidosulfonic acid.

It is already known to prepare ammonium sulfamate by injecting ammonia and sulfur trioxide under pressure (German Offenlegungsschrift No. 1,915,723). This process is carried out under conditions under which the reaction product is obtained in a molten state. The reaction product is mainly composed of ammonium sulfamate together with small proportions of ammonium imidodisulfonate and a little ammonium sulfate. It is possible to use ammonia and sulfur trioxide in liquid form in this process and, for example, to follow a procedure in which ammonia and sulfur trioxide are introduced by inlet tubes directly into the liquid, molten reaction mixture present in the lower part of the reaction vessel.

In accordance with the teaching of this literature reference, the reaction is carried out with an excess of ammonia which is preferably 2 to 4 times the stoichiometric quantity. The excess ammonia is withdrawn from the reaction vessel and can be re-employed again.

It can happen in this process that, if excess ammonia is blown off continuously, the exit gas lines and valves become obstructed very quickly by entrained droplets of melt and solid components. In order to overcome this problem, a less than equivalent quantity of ammonia is used in accordance with German Offenlegungsschrift No. 2,710,399; the gases accumulating over the melt in the reactor are not removed from the reaction space. However, using a les than equivalent quantity of ammonia leads to other disadvantages. Thus, the reaction rate and the degree of conversion are reduced, if, as a result of the decomposition of ammonium sulfamate at an elevated temperature, nitrogen is formed, which accumulates as an inert gas in the gas space of the reactor and thus reduces the partial pressure of ammonia.

In order to overcome this disadvantage it is, therefore, recommended in German Offenlegungsschrift No. 2,909,033 that the pressure should be released briefly in the pressure vessel after fairly long reaction periods and the bulk of the accumulated inert gases should thus be discharged.

It is known from German Offenlegungsschrift No. 2,909,032 that the space-time yield of ammonium sulfamate melt in a given reactor is primarily limited by the extent to which it is possible to remove the heat liberated in the reaction. It is therefore recommended that the reactant ammonia should be employed wholly or partially in the liquid form and the latent heat of vaporization of ammonia should thus be utilized for cooling. Here too, no excess ammonia is passed throught the reactor. Furthermore, there is no explicit indication in this literature reference of the point at which the liquid ammonia is introduced into the enamelled stirred vessel.

The object therefore was to find a process which does not suffer from the disadvantages of the known processes. Such a process should combine the optimum cooling action of liquid ammonia in excess with the continuous discharge of excess ammonia and should, on the other hand, not be susceptible to obstruction of the gas exit pipes.

A process has now been found for the continuous preparation of ammonium sulfamate, starting from ammonia and sulfur trioxide, in which liquid sulfur trioxide and liquid ammonia are introduced in a molar ratio $NH_3/SO_3$ greater than 2.0:1 into a pressure reactor containing the reaction product in the molten state, excess ammonia being removed continuously from the reactor and the liquid sulfur trioxide being introduced into the melt. The process comprises introducing the liquid ammonia onto the surface of the melt. Sulfur trioxide is introduced into the melt, for example, through a tube dipping into the latter. It has been found that the excess ammonia leaving the reactor no longer contains any solid components, even if the ammonia is fed as a liquid into the reactor in a fairly large excess. If, on the other hand, the liquid ammonia is added below the surface of the melt, a good deal of melt is spattered and an appreciable amount of solid components are entrained by the unreacted ammonia. In the process according to the invention, it is possible to cool the melt and to remove a large part of the considerable heat of reaction by direct vaporization cooling, by means of the excess ammonia which is vaporized. Some of the heat of reaction is removed by wall cooling or by cooling coils or by means of a heat exchanger through which the melt flows. The quantity of ammonia here is preferably 1.1 to 10 times, but particularly 1.2 to 4 times, the quantity required by stoichiometry for the formation of ammonium sulfamate (the molar ratio $NH_3/SO_3$ is 2.2:1 to 20:1, in particular 2.4:1 to 8:1).

The process is carried out under pressure, preferably under a pressure of 2 to 30 bars, in particular 5 to 20 bars, and at a temperature of 120° to 300° C., preferably 160° to 250° C. The excess ammonia is removed from the reactor in the gaseous state. It can be liquefied by compression and cooling and be re-employed in the process. A particular embodiment of the process according to the invention comprises condensing vaporized excess ammonia in a reflux condenser placed on top of the reactor and then returning the ammonia to the reactor. It is also possible to absorb the excess ammonia in water or dilute nitric acid and to use the absorption solution for the production of fertilizers.

The process is preferably carried out continuously by introducing the starting materials continuously and removing the resulting melt of ammonium sulfamate continuously. It is advantageous if the sulfur trioxide introduced is distributed in the melt as rapidly as possible. This can be achieved by arranging for the melt in the reactor to flow past the inlet point for sulfur trioxide at a high rate of flow. It is best to use a stirred kettle. The inlet point for $SO_3$ should dip as deeply as possible into the melt so that no $SO_3$ escapes into the gas space. It is not desirable for $SO_3$ to react with $NH_3$ in the gas space. Since the melt is very corrosive, it is also advantageous to use an enamelled kettle as the pressure reactor.

The reaction product contains approx. 80–86.5% of ammonium sulfamate, 10–15% of ammonium imidosulfonate, 3–5% of ammonium sulfate and approx. 0.3–0.5% of free ammonia. (About 1% of ammonium sulfate is formed as a result of water which is carried over with the $NH_3$ and $SO_3$ used as feedstock. The remainder is formed by side reactions in the melt. Although gaseous feedstocks are free from water, they also result in melts containing approx. 5% of ammonium sulfate). The reaction product can be directly reacted with acids, for example dilute nitric acid, to give amidosulfonic acid. The invention is illustrated in greater detail in the examples below.

EXAMPLE 1

(a) Apparatus

The apparatus used is shown diagrammatically in the FIGURE. The reaction vessel used is a 3 m³ enamelled stirred vessel (1) having a stirrer (19). Sulfur trioxide is introduced via the inlet line (3) into the stock tank (4). Sulfur trioxide is introduced by means of the diaphragm pump (5) via lined (14) and valve (6) into the melt (15) through the inlet pipe (7). In so doing, care must be taken to ensure optimum distribution of the sulfur trioxide in the melt (before introducing the SO₃, it is appropriate to clear the pipe (7) by flushing with nitrogen). At the same time, liquid ammonia is introduced into the kettle (1) on to the melt (15), via the line (2). The reactor (1) is equipped with a cooling jacket (11) in order to remove the heat of the reaction. This cooling jacket is cooled with heat transfer oil. The melt is removed continuously from the reactor via line (10) after reducing the pressure by means of the valve (9) and is, for example, reacted further with nitric acid. The ammonia leaving the reactor via line (13) is condensed in the condenser (12) and is recycled back to the reactor (1) via lines (16) and (13). The condenser (12) is kept at the required temperature by means of a cooling circulation employing water or brine. The excess ammonia, together with inert gases, leaves the system via valve (17) and line (18).

Another variant of the process (not illustrated) comprises absorbing the ammonia required for the reaction in a column instead of condensing it.

(b) Procedure 442 kg/hour of sulfur trioxide and 350 kg/hour of liquid ammonia are introduced into the kettle 1. The molar ratio $NH_3/SO_3$ is approx. 3.7:1, the reaction temperature is 210° and the pressure is 7 bars. The flow temperature of the oil is 90° C.

625 kg of melt (composition: 83% by weight of ammonium sulfamate, 13% by weight of ammonium imidodisulfonate, 3.5% by weight of ammonium sulfate and 0.5% by weight of ammonia) are produced per hour, from which 470 kg of amidosulfonic acid can be obtained after reaction with nitric acid.

EXAMPLE 2

The same apparatus is used as in Example 1. 436 kg/hour of $SO_3$ and 248 kg/hour of $NH_3$ (molar ratio $SO_3:NH_3 = 1:2.7$) are introduced into the reactor at a reaction temperature of 218° C. and a pressure of 8 bars. 617 kg/hour of melt of the same composition as in Example 1 are formed in this way. 462 kg/hour of amidosulfonic acid can be produced therefrom after reaction with nitric acid.

On being stirred, the surface of the melt forms a vortex. The end of the $NH_3$ inlet pipe is only a little above the lowest point of the vortex. This ensures that the liquid $NH_3$ hardly comes into contact with the interior face of the reactor and that it flows from this point onto the melt. Using a reactor which is enamelled inside, there would be a risk of the enamelling chipping off if liquid $NH_3$ were to impinge on the interior face.

We claim:

1. A process for the continuous preparation of ammonium sulfamate, starting from ammonia and sulfur trioxide, by introducing liquid sulfur trioxide and liquid ammonia in a molar ratio $NH_3/SO_3$ greater than 2.0:1 into a pressure reactor containing the reaction product in a molten state, excess ammonia being removed continuously from the reactor and the liquid sulfur trioxide being introduced into the melt, which comprises introducing the liquid ammonia onto the surface of the melt.

2. A process as claimed in claim 1, wherein the molar ratio $NH_3/SO_3$ of the products which are introduced is 2.2:1 to 20:1.

3. A process as claimed in claim 1 or 2, wherein the excess ammonia is condensed in a reflux condenser and recycled to the reactor.

4. A process as claimed in claim 1, wherein the melt in the reactor is made to flow past the inlet point for sulfur trioxide at a high rate of flow.

5. A process as claimed in claim 1, which is carried out under a pressure of 2 to 30 bars.

6. A process as claimed in claim 1, which is carried out under a pressure of from 5 to 20 bars.

7. A process as claimed in claim 1, 5 or 6, wherein a temperature of 160° to 250° C. is maintained in the melt.

8. A process as claimed in claim 1, wherein an enamelled kettle is used as the pressure reactor.

* * * * *